US00RE46932E

(19) United States
(12) Reissued Patent
Sugiyama

(10) Patent Number: US RE46,932 E
(45) Date of Reissued Patent: Jul. 3, 2018

(54) OPTICAL MODULATOR MODULE

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

(21) Appl. No.: 15/134,763

(22) Filed: Apr. 21, 2016

Related U.S. Patent Documents

Reissue of:
(64) Patent No.: 8,712,195
Issued: Apr. 29, 2014
Appl. No.: 13/067,367
Filed: May 26, 2011

(30) Foreign Application Priority Data

Aug. 30, 2010 (JP) ..... 2010-192142

(51) Int. Cl.

| | |
|---|---|
| ***G02F 1/01*** | (2006.01) |
| ***H01P 3/08*** | (2006.01) |
| ***H03H 7/38*** | (2006.01) |
| ***G02B 6/12*** | (2006.01) |
| ***H01P 1/00*** | (2006.01) |
| ***G02F 1/07*** | (2006.01) |
| ***G02F 1/03*** | (2006.01) |
| ***H01P 5/00*** | (2006.01) |
| ***G02F 1/035*** | (2006.01) |

(52) U.S. Cl.
CPC ..... *G02F 1/0327* (2013.01); *G02F 1/035* (2013.01); *G02F 1/0305* (2013.01); *G02F 1/0316* (2013.01)

(58) Field of Classification Search
CPC ..... G02F 1/0327; G02F 1/035; G02F 1/0316; G02F 1/0305
See application file for complete search history.

(56) References Cited

U.S. PATENT DOCUMENTS 4,626,805 A * 12/1986 Jones ..... 333/33
4,951,011 A * 8/1990 Heckaman et al. ..... 333/33
5,208,697 A * 5/1993 Schaffner et al. ..... 359/254
(Continued)

FOREIGN PATENT DOCUMENTS

JP 4-336702 11/1992
JP 7-261135 10/1995
(Continued)

OTHER PUBLICATIONS

U.S. Corrected Notice of Allowability for U.S. Appl. No. 13/067,367, dated Mar. 28, 2014.
(Continued)

*Primary Examiner* — James Menefee
(74) *Attorney, Agent, or Firm* — Staas & Halsey LLP

(57) ABSTRACT

Disclosed is an optical modulator module including an optical modulator configured to have a signal electrode and a ground electrode; a conductive package configured to accommodate the optical modulator and have electrical continuity with the ground electrode of the optical modulator; a substrate configured to have a ground electrode on a first surface thereof electrically connected to the package by solder or a conductive adhesive and have a signal electrode on another surface thereof; and a lead pin configured to electrically connect the signal electrode of the optical modulator to the signal electrode of the substrate.

21 Claims, 18 Drawing Sheets

(56) References Cited

U.S. PATENT DOCUMENTS

| | | | | |
|---|---|---|---|---|
| 5,999,667 | A * | 12/1999 | Castoldi | G02B 6/1342 385/2 |
| 6,111,474 | A * | 8/2000 | Nibe | 333/26 |
| 7,274,837 | B2 | 9/2007 | Tanaka et al. | |
| 7,471,520 | B2 * | 12/2008 | Schwiebert et al. | 361/760 |
| 8,437,583 | B2 * | 5/2013 | Ban | 385/14 |
| 2003/0030516 | A1 * | 2/2003 | Tsukiyama et al. | 333/247 |
| 2003/0147575 | A1 * | 8/2003 | Sugiyama | G02F 1/0305 385/2 |
| 2003/0151792 | A1 * | 8/2003 | Kaitoh | G02F 1/0305 359/279 |
| 2004/0120626 | A1 * | 6/2004 | Kornrumpf et al. | 385/2 |

FOREIGN PATENT DOCUMENTS

| | | |
|---|---|---|
| JP | 2001-144366 | 5/2001 |
| JP | 2005-228766 | 8/2005 |
| JP | 2007-42756 | 2/2007 |
| JP | 2009-252918 | 10/2009 |

OTHER PUBLICATIONS

U.S. Notice of Allowance for U.S. Appl. No. 13/067,367, dated Nov. 25, 2013.
U.S. Office Action for U.S. Appl. No. 13/067,367, dated Jul. 1, 2013.
U.S. Office Action for U.S. Appl. No. 13/067,367, dated Mar. 15, 2013.
Patent Abstracts of Japan, Publication No. 4-336702, Published Nov. 24, 1992.
Patent Abstracts of Japan, Publication No. 2009-252918, Published Oct. 29, 2009.
Patent Abstracts of Japan, Publication No. 2007-042756, Published Feb. 15, 2007.
Patent Abstracts of Japan, Publication No. 2001-144366, Published May 25, 2001.
Patent Abstracts of Japan, Publication No. 07-261135, Published Oct. 13, 1995.
Japanese Patent Office Action issued in Japanese Patent Application No. 2010-192142 dated Jan. 21, 2014.

* cited by examiner

OPTICAL MODULATOR MODULE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is based upon and claims the benefit of priority of Japanese Patent Application No. 2010-192142, filed on Aug. 30, 2010, the entire contents of which are incorporated herein by reference.

FIELD

The embodiment discussed herein is related to an optical modulator module.

BACKGROUND

Optical waveguide devices each using an electro-optic crystal such as a $LiNbO_3$ (LN) substrate and a $LiTaO_2$ substrate have been developed. In order to form such an optical waveguide device, an optical waveguide is first formed in such a manner that a metal film made of titanium or the like is formed and thermally diffused on a part of a crystal substrate or is subjected to proton exchange under benzoic acid after being patterned. With provision of electrodes near the optical waveguide, the optical waveguide device is formed. An example of such an optical waveguide device includes an optical modulator.

An optical modulator is accommodated in a metal package and mounted in a transmitter as an optical modulator module. Recently, various surface-mounting type components have been developed for the purpose of improving mounting performance (see, for example, Patent Document 1). However, they give rise to a problem in high-frequency characteristics.

Patent Document 2 discloses a configuration in which a spacer is interposed between a package and a flexible substrate to alleviate impedance mismatching. Patent Document 3 discloses a configuration in which a lead pin is mounted parallel on the signal electrode pad of an FPC and solder-connected.

Patent Document 1: Japanese Laid-open Patent Publication No. 4-336702

Patent Document 2: Japanese Laid-open Patent Publication No. 2007-42756

Patent Document 1: Japanese Laid-open Patent Publication No. 2009-252918

However, the configurations of Patent Documents 2 and 3 put limitations on space.

SUMMARY

According to an aspect of the present invention, there is provided an optical modulator module including an optical modulator configured to have a signal electrode and a ground electrode; a conductive package configured to accommodate the optical modulator and have electrical continuity with the ground electrode of the optical modulator; a substrate configured to have a ground electrode on a first surface thereof electrically connected to the package by solder or a conductive adhesive and have a signal electrode on another surface thereof; and a lead pin configured to electrically connect the signal electrode of the optical modulator to the signal electrode of the substrate.

The object and advantages of the present invention will be realized and attained by means of the elements and combinations particularly pointed out in the claims.

It is to be understood that both the foregoing general description and the following detailed description are exemplary and explanatory and are not restrictive of the present invention as claimed.

DESCRIPTION OF EMBODIMENTS

Next, embodiments are described below with reference to the accompanying drawings.

Figure 1A:
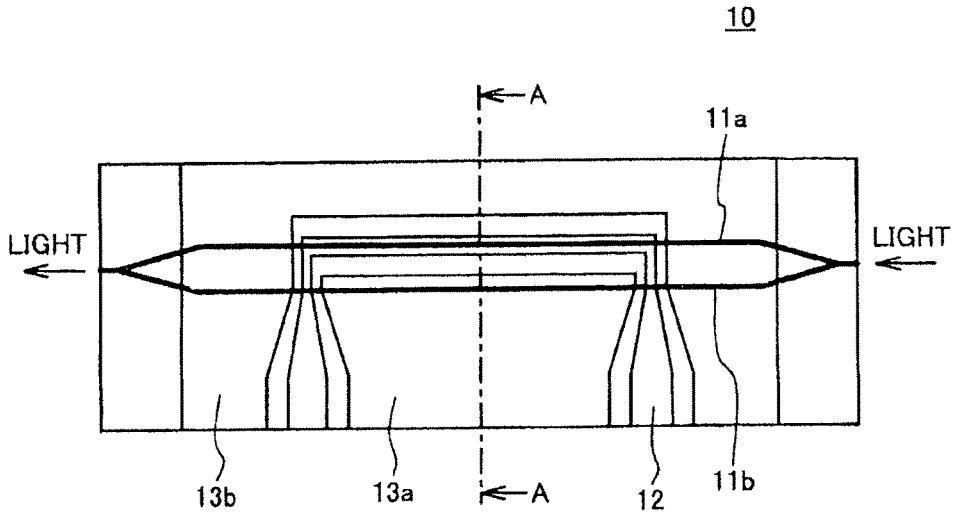
FIG.1A RELATED ART
FIGS. 1A and 1B are a schematic plan view of a Mach-Zehnder type optical modulator and a cross-sectional view taken along line A-A in FIG. 1A, respectively.
Figure 1B:
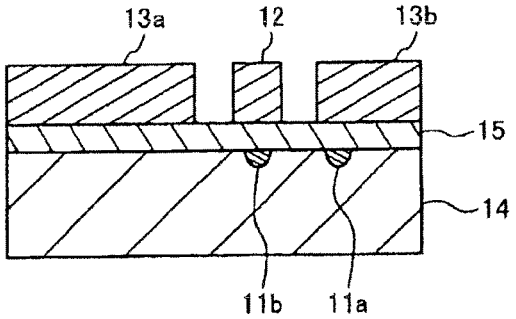
FIG.1B RELATED ART

First, a Mach-Zehnder type optical modulator is described as an example of an optical modulator provided in an optical modulator module. FIG. 1A is a schematic plan view of a Mach-Zehnder type optical modulator 10. FIG. 1B is a cross-sectional view taken along line A-A in FIG. 1A. As illustrated in FIGS. 1A and 1B, the optical modulator 10 has a substrate 14 in which an optical waveguide is formed. The substrate 14 is an electro-optic substrate having an electro-optic crystal such as a $LiNbO_3$ (LN) substrate and a $LiTaO_2$ substrate.

The optical waveguide includes an incident waveguide, parallel waveguides 11a and 11b formed to branch from the incident waveguide, and an emitting waveguide in which the parallel waveguides 11a and 11b merge with each other. The optical waveguide is formed in such a manner that metal such as Ti (titanium) is thermally-diffused into the substrate 14.

As illustrated in FIG. 1B, a buffer layer 15 is provided at a surface on the side of the optical waveguide of the substrate 14. The optical waveguide is covered with the buffer layer 15. The buffer layer 15 is provided to prevent light transmitted through the optical waveguide from being absorbed in electrodes described below. The buffer layer 15 is made of, for example, $SiO_2$ or the like and has a thickness of about 0.2 through 2 μm.

On the parallel waveguide 11b, a signal electrode 12 is provided via the buffer layer 15. On the parallel waveguide 11a, a ground electrode 13b is provided via the buffer layer 15. Further, on the buffer layer 15, a ground electrode 13a is provided on the side opposite to the ground electrode 13b in such a manner as to sandwich the signal electrode 12 between the ground electrodes 13a and 13b. Thus, the signal electrode 12 and the ground electrodes 13a and 13b form coplanar electrodes. If a Z-cut substrate is used as the substrate 14, the signal electrode 12 and the ground electrode 13b are arranged right above the parallel waveguides to make use of refractive-index fluctuations resulting from electrolysis in a Z direction.

In order to drive the optical modulator 10 at high speed, the ends of the signal electrode 12 and the ground electrodes 13a and 13b are connected by a resistor to form a traveling wave electrode and a micro wave signal is applied on the input side of the traveling wave electrode. In this case, the refractive indexes of the parallel waveguides 11a and 11b fluctuate, for example, like $+\Delta n$ and $-\Delta n$ due to an electric field. Thus, due to fluctuations in phase difference between the parallel waveguides 11a and 11b, Mach-Zehnder interference occurs. As a result, signal light having modulated intensity is output from the emitting waveguide. The effective refractive index of microwaves can be controlled with a change in the cross-sectional shapes of the electrodes, and high-speed light response characteristics can be obtained by matching the speeds of light and microwaves.

Figure 2A:
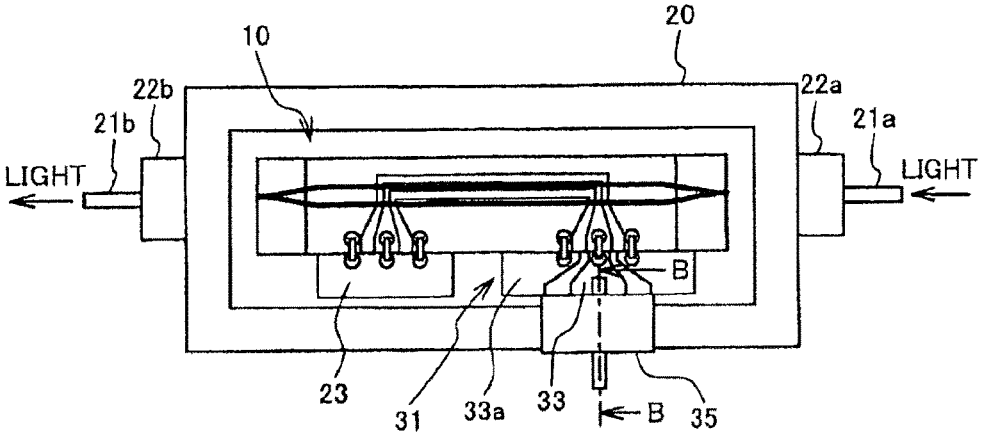
FIG.2A RELATED ART
FIGS. 2A, 2B, and 2C are a schematic plan view of an optical modulator module according to a first comparative example, a cross-sectional view of the optical modulator module taken along line B-B in FIG. 2A, and a view illustrating a state in which a ground electrode is connected to a ground electrode formed at the under surface of a relay substrate by way of a via-hole, respectively.
Figure 2B:
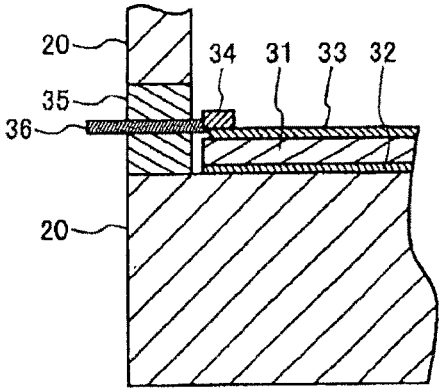
FIG.2B RELATED ART

FIG. 2A is a schematic plan view of an optical modulator module according to a first comparative example. FIG. 2B is a cross-sectional view of the optical modulator module taken along line B-B in FIG. 2A. As illustrated in FIGS. 2A and 2B, the optical modulator 10 is accommodated in a metal package 20. Although not illustrated in FIGS. 2A and 2B, a cover may be provided above the package 20. At one end of the package 20 is provided a connector 22a in which an optical fiber 21a penetrates. At the other end of the package 20 is provided a connector 22b in which an optical fiber 21b penetrates. The incident waveguide of the optical modulator 10 is arranged to coincide with the optical axis of the optical fiber 21a. The emitting waveguide of the optical modulator 10 is arranged to coincide with the optical axis of the optical fiber 21b.

An end of the signal electrode 12 and first ends of the ground electrodes 13a and 13b are connected to each other via a terminal resistor 23. Another end of the signal electrode 12 and other ends of the ground electrodes 13a and 13b are guided to an outside via a relay substrate 31. At the top surface of the relay substrate 31, a signal electrode 33 for the signal electrode 12 is formed. To the signal electrode 33 is connected a lead pin 36 by solder 34. The lead pin 36 extends to the outside via a coaxial connector 35 that penetrates the side wall of the package 20. Note that since the lead pin 36 is harder than lead wire, it can accurately maintain an interval between ground such as the metal package 20 and the lead pin 36. Accordingly, the lead pin 36 can accurately take impedance matching as a transmission path.

Figure 2C:
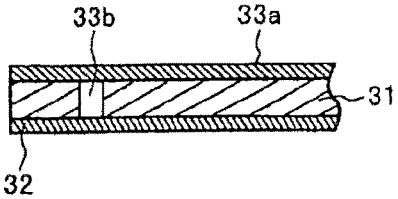
FIG.2C RELATED ART

At the upper surface of the relay substrate 31, a ground electrode 33a connected to the ground electrodes 13a and 13b is further formed. As illustrated in FIG. 2C, the ground electrode 33a is connected to a ground electrode 32 formed at the under surface of the relay substrate 31 by way of a via-hole 33b. The ground electrode 32 has electrical continuity with the package 20. The package 20 is grounded.

In the optical modulator module according to the first comparative example, it is necessary to input an electric signal output from a driver amplifier to the lead pin 36 via an edge-mount type connector or the like. Accordingly, it is difficult for the optical modulator module to be mounted.

Figure 3A:
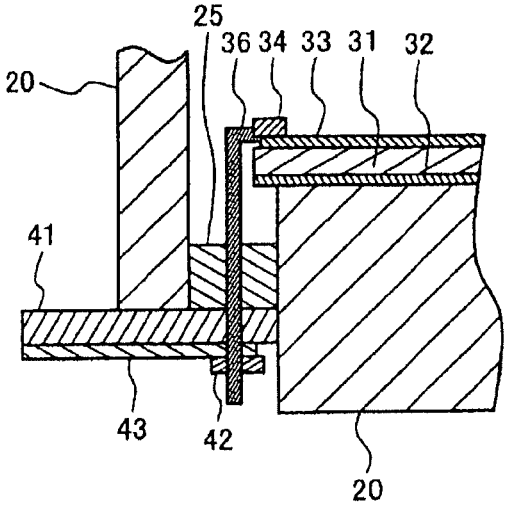
FIG.3A RELATED ART
FIGS. 3A and 3B are view for explaining an optical modulator module according to a second comparative example.
Figure 3B:
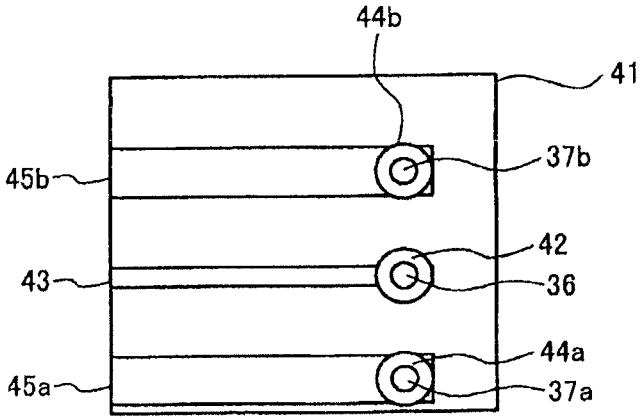
FIG.3B RELATED ART

FIGS. 3A and 3B are views for explaining an optical modulator module according to a second comparative example. The optical modulator module according to the second comparative example is a surface-mounting type module for facilitating its mounting. In the optical modulator module according to the second comparative example, an electric signal output from a driver amplifier is input from a print substrate. Accordingly, the optical modulator module has improved mounting performance.

FIG. 3A is a view corresponding to the view illustrated in FIG. 2B. In the second comparative example, a flexible substrate 41 is used for the purpose of improving mounting performance. The flexible substrate 41 having flexibility is made of polyimide, liquid crystal polymer, or the like. In this example, an insulative glass member 25 that penetrates a package 20 is provided at the under surface of the package 20. The glass member 25 is formed into a cylindrical shape as an example. Further, the flexible substrate 41 is provided at the under surface of the glass substrate 25. A lead pin 36 extends to the under surface of the flexible substrate 41 while penetrating the glass substrate 25 and the flexible substrate 41.

In this example, a lead pin 37a (FIG. 3B) connected to a ground electrode 45a via a ground electrode 32 and a lead pin 37b connected to a ground electrode 45b via the ground electrode 32 are provided. The lead pins 37a and 37b extend to the under surface of the flexible substrate 41 while penetrating the glass member 25 and the flexible substrate 41. The lead pins 37a and 37b are symmetrically arranged about the lead pin 36.

FIG. 3B is a view seen from the under surface side of the flexible substrate 41. As illustrated in FIG. 3B, a signal electrode 43 and the ground electrodes 45a and 45b are formed at the under surface of the flexible substrate 41. The lead pin 36 is connected to the signal electrode 43 via solder 42. The lead pin 37a is connected to the ground electrode 45a via solder 44a. The lead pin 37b is connected to the ground electrode 45b via solder 44b. The ground electrodes 45a and 45b are symmetrically arranged about the signal electrode 43. Thus, a coplanar line (CPW) is formed.

According to the configuration of the second comparative example, since the ground lead pins and the signal lead pin can be soldered at the under surface of the flexible substrate 41, the optical modulator module has high mounting performance. This configuration is particularly effective if the optical modulator module has a large number of the lead pins. However, it is necessary to set an interval of, for example, 1 mm or more between the adjacent lead pins in order to solder the lead pins. In this case, the interval between the signal electrode and the ground electrodes becomes large. Thus, an characteristic impedance locally greatly deviates from a desired value (for example 50Ω), whereby reflecting characteristics (FIG. 5A, S11) are degraded. Further, since contact areas between the ground lead pins and the electrodes are limited to only the parts of the lead pins, grounding cannot be sufficiently established for high frequency. Thus, transmitting characteristics (S21) are degraded. The reflecting characteristics (S11) and the transmitting characteristics (S21) may present problems at a high-speed modulation band such as 20 Gbps and 40 Gbps. Further, a modulator having plural signal lines such as a DQPSK modulator and a DP-QPSK modulator may give rise to problems in that it has a difficulty in its high density and requires a large mounting space. In view of this, the following embodiments describe optical modulator modules capable of realizing both high frequency characteristics and mounting performance while accommodating limitations in space.

Here, the reflecting characteristics (S11) refer to the ratio of reflecting power (Pr) to input power Pin input from a driver amplifier to an optical modulator. The transmitting characteristics (S21) refer to the ratio of output power Pout to the input power Pin input from the driver amplifier to the optical modulator. Specifically, the reflecting characteristics (S11) are calculated by Pr/Pin (dB), and the transmitting characteristics (S21) are calculated by Pout/Pin (dB).

First Embodiment

Figure 4A:
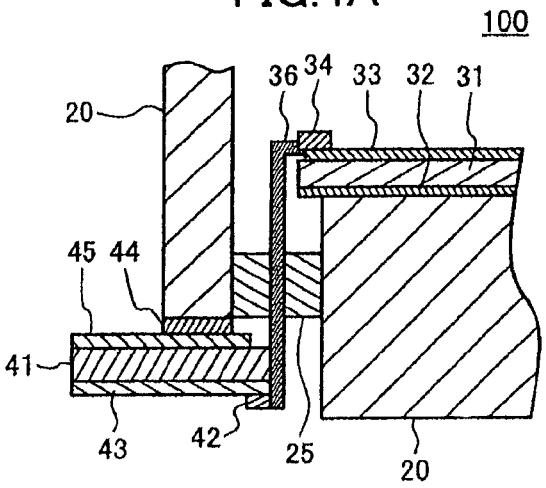
FIGS. 4A through 4D are views for explaining an optical modulator module according to a first embodiment.
Figure 4B:
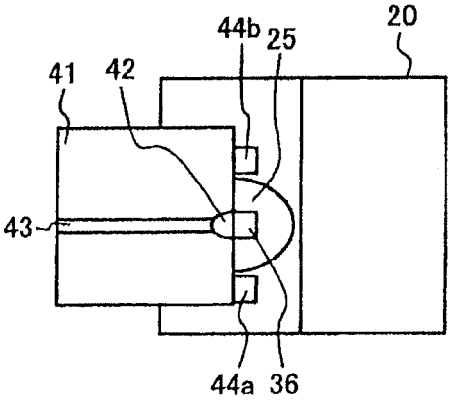
Figure 4C:
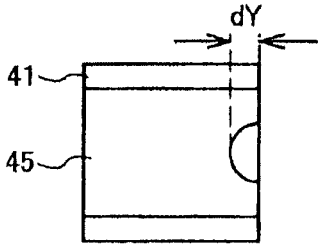

FIGS. 4A through 4C are views for explaining an optical modulator module 100 according to a first embodiment. The optical modulator module 100 is a surface-mounting type module for facilitating its mounting. FIG. 4A is a view corresponding to the view illustrated in FIG. 3A. FIG. 4B is a view corresponding to the view illustrated in FIG. 3B and seen from the under surface sides of a flexible substrate 41 and a package 20. FIG. 4C is a view seen from the top surface side of the flexible substrate 41.

As illustrated in FIGS. 4A and 4B, a lead pin 36 penetrates a glass member 25 and extends to the under surface of the flexible substrate 41 while being in contact with the side surface of the flexible substrate 41. In this embodiment, the glass member 25 is formed into a cylindrical shape, and the lead pin 36 penetrates the substantial center of the cylindrical shape. The lead pin 36 is connected to a signal electrode 43 at the under surface of the flexible substrate 41 via solder 42.

Note that since the lead pin 36 is provided to be in contact with the side surface of the flexible substrate 41, a contact area between the lead pin 36 and the flexible substrate 41 may not be sufficiently obtained. However, if the cross section of the lead pin 36 is formed into a rectangular shape, it is possible to sufficiently ensure the contact area between the lead pin 36 and the flexible substrate 41.

On the top surface of the flexible substrate 41, a ground electrode 45 having a predetermined width is formed. Since the lead pin 36 is provided along the side surface of the flexible substrate 41, the ground electrode 45 is formed to be away from the side surface. For example, the ground electrode 45 may be provided to avoid a semi-circular region surrounding a part at which the lead pin 36 is provided. The ground electrode 45 is connected to the external wall (for example, the under surface) of the package 20 via solder 44. For example, the ground electrode 45 may be connected to the under surface of the package 20 at a part adjacent to the glass member 25.

In this embodiment, with the provision of the lead pin 36 at the side surface of the flexible substrate 41, the side surface of the flexible substrate 41 is away from the package 20. This enables confirmation as to whether the solder 44 flows out from the under surface side of the flexible substrate 41. In FIG. 4B, flowing out of the solder is confirmed by the existence of solder 44a and 44b, which enables the confirmation of the connecting state between the package 20 and the ground electrode 45 of the flexible substrate 41. Accordingly, manufacturing yield can be maintained at high level.

In this embodiment, without the use of a ground lead pin, the ground electrode 45 formed on the top surface of the flexible substrate 41 and the external wall of the package 20 are connected to each other. In this case, a contact area between the ground electrode 45 and the external wall of the package 20 become larger compared with a case in which the ground lead pin is used. Thus, grounding can be sufficiently established for high frequency. As a result, degradation of S parameters can be suppressed. Further, since there is no need to use a spacer or the like to reduce impedance mismatching, limitation in space can be suppressed.

Further, in this embodiment, a micro strip line (MSL) structure is formed by the ground electrode 45 having a predetermined width on the top surface of the flexible substrate 41 and the signal electrode 43 on the under surface of the flexible substrate 41. A characteristic impedance is controlled by the influences of the thickness of a substrate and a signal line width. Therefore, controlling the thickness of the flexible substrate 41 and the line width of the signal electrode 43 in the vicinity of their desired values provides an impedance having a desired value (for example, 50Ω). Thus, the optical modulator module 100 has improved reflecting characteristics (S11).

Further, the provision of the signal electrode 43 on the under surface of the flexible substrate 41 facilitates the mounting of the optical modulator module 100. Note that the ground electrode 45 can extend to the under surface of the flexible substrate 41 via a via-hole or the like. Accordingly, the optical modulator module 100 can be surface-mounted by the flexible substrate 41.

Thus, according to this embodiment, the optical modulator module 100 can realize its high frequency characteristics and mounting performance while accommodating limitations in space.

Figure 4D:
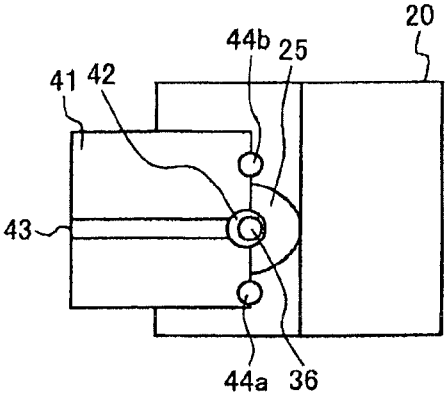

Note that the solder 44 used in this embodiment may be replaced by a conductive adhesive or the like. Further, as illustrated in FIG. 4D, in a case where a lead pin 36 having a circular cross section is used, a part of the flexible substrate 41 at which the lead pin 36 is in contact with may be cut into a semicircular shape. In this case, a contact area between the lead pin 36 and the flexible substrate 41 can be increased. Moreover, the flexible substrate 41 used in this embodiment may be replaced by a substrate having high rigidity.

Figure 5A:
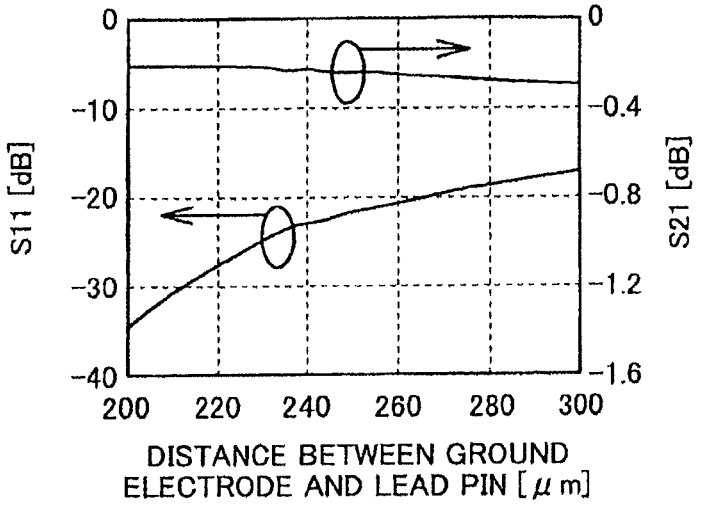
FIGS. 5A and 5B are graphs illustrating calculation results of a relationship between S parameters at 30 GHz and a shortest distance dY.

Note that although a cross-sectional shape at a connection part between the package 20 and the flexible substrate 41 preferably has a MSL structure, a part of the ground electrode 45 is formed to avoid the lead pin 36 as illustrated in FIG. 4C. This is aimed at avoiding short-circuits and local reduction of impedance. However, if the lead pin 36 is excessively away from the ground electrode 45, a MSL mode is not established and high frequency characteristics are degraded. Therefore, a shortest distance dY between the ground electrode 45 and the lead pin 36 is preferably set to be within an appropriate range. FIG. 5A is a graph illustrating calculation results of a relationship between the S parameters at 30 GHz and the shortest distance dY. As illustrated in FIG. 5A, the shortest distance dY is preferably set to be less than or equal to 260 μm in order to suppress the reflecting characteristics (S11) below −20 dB.

Figure 5B:
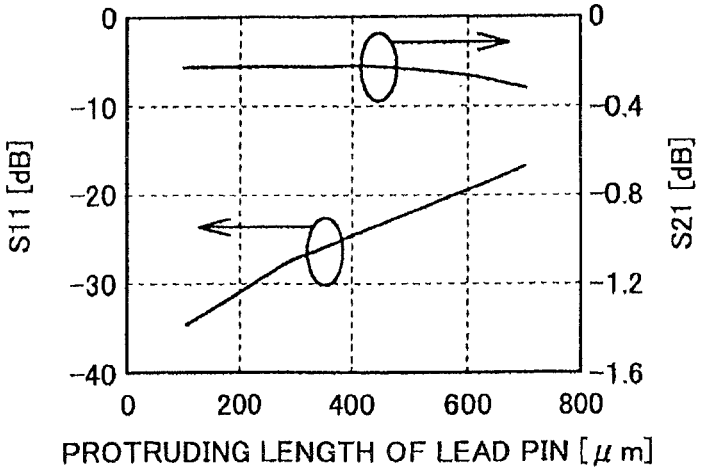

Note that in the second comparative example, the signal lead pin and the ground lead pins penetrate and protrude from the substrate. However, in this embodiment, only the lead pin 36 protrudes downward from the under surface of the flexible substrate 41. Thus, a distance from the tip end of the lead pin 36 to the ground electrode 45 becomes large. If the protruding length of the lead pin 36 becomes large, impedance mismatching may become significant. In view of this, a relationship between the protruding length of the lead pin 36 and the S parameters at 30 GHz was calculated. The calculation results are illustrated in FIG. 5B. As illustrated in FIG. 5B, in order to suppress the reflecting characteristics (S11) below −20 dB, the length of the lead pin 36 protruding from the flexible substrate 41 is preferably set to be less than or equal to 590 μm.

According to the configuration illustrated in FIGS. 4A through 4C, the contact area between the ground electrode 45 and the package 20 becomes large. In this case, when temperature or humidity changes, stress resulting from a difference in expansion coefficient between the flexible substrate 41, the solder 44, and the package 20 becomes high, which may bring about characteristic degradation or breakage in the modulator. This problem becomes remarkable particularly in a modulator having a large number of terminals such as a DP-QPSK modulator and may become a main factor that degrades the long-term reliability of the modulator.

(Another Example (1) of Flexible Substrate)

Figure 6A:
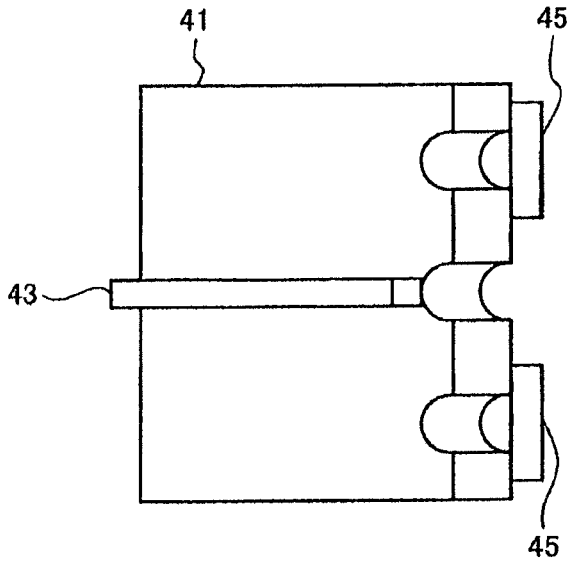
FIGS. 6A and 6B are views for explaining another example of a flexible substrate according to the first embodiment.
Figure 6B:
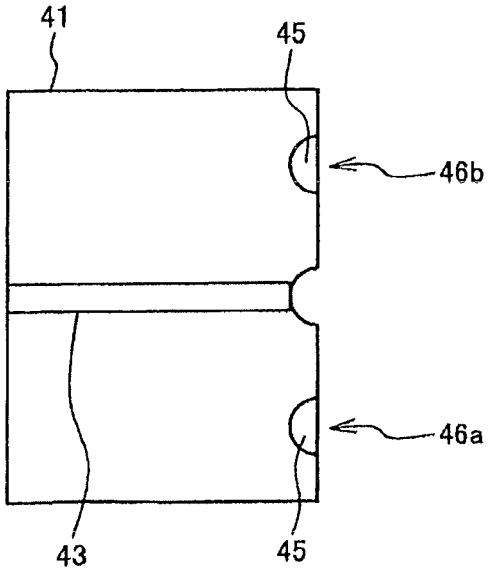

Therefore, it is preferable that the ground electrode 45 can be observed from the under surface side of the flexible substrate 41. FIGS. 6A and 6B are views for explaining another example of the flexible substrate 41. FIG. 6A is a perspective view illustrating the under surface of the flexible substrate 41 and the side surface of the flexible substrate 41 on the side of the lead pin 36. FIG. 6B is a plan view illustrating the under surface of the flexible substrate 41.

As illustrated in FIGS. 6A and 6B, a notch is formed in the flexible substrate 41 at a part at which the lead pin 36 is arranged. The lead pin 36 is arranged at the notch and connected to the signal electrode 43. In the side surface of the flexible substrate 41 on the side of the lead pin 36, notches 46a and 46b may be further formed. The shapes of the notches 46a and 46b include, but are not particularly limited to, a semi-circular shape as an example. The notches 46a and 46b are symmetrically provided about the notch at which the lead pin 36 is arranged. Further, the notches 46a and 46b are provided at a part at which the ground electrode 45 illustrated in FIG. 4C is formed. Thus, the ground electrode 45 can be confirmed from the under surface side of the flexible substrate 41. Further, flowing out of the solder 44 that connects the ground electrode 45 to the package 20 can be confirmed.

(Another Example (2) of Flexible Substrate)

Figure 7A:
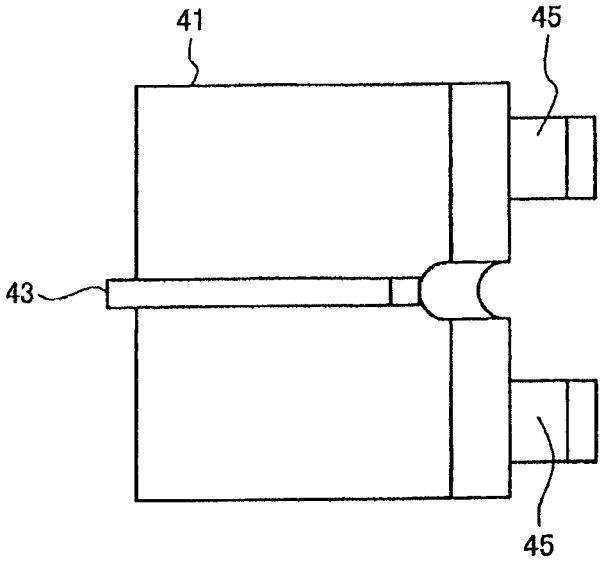
FIGS. 7A and 7B are views for explaining another example of the flexible substrate.
Figure 7B:
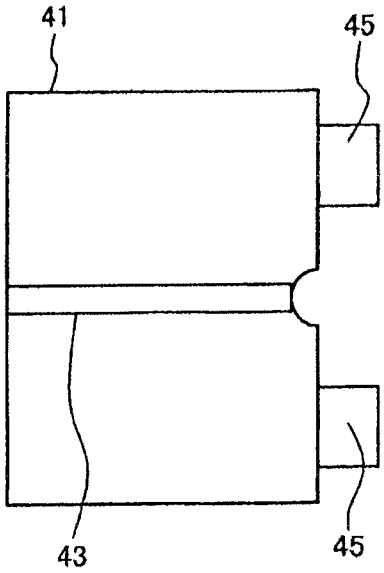

FIGS. 7A and 7B are views for explaining another example of the flexible substrate 41. FIG. 7A is a perspective view illustrating the under surface of the flexible substrate 41 and the side surface 41 on the side of the lead pin 36 of the flexible substrate 41. FIG. 7B is a plan view illustrating the under surface of the flexible substrate 41.

As illustrated in FIGS. 7A and 7B, a part of the ground electrode 45 may be a flying lead that protrudes from the end part of the flexible substrate 41. In this case, the flying lead can be confirmed from the end of the flexible substrate on the side of the lead pin 36. Thus, the ground electrode 45 can be confirmed. Further, flowing out of the solder 44 that connects the ground electrode 45 to the package 20 can be confirmed.

(Another Example (3) of Flexible Substrate)

Figure 8A:
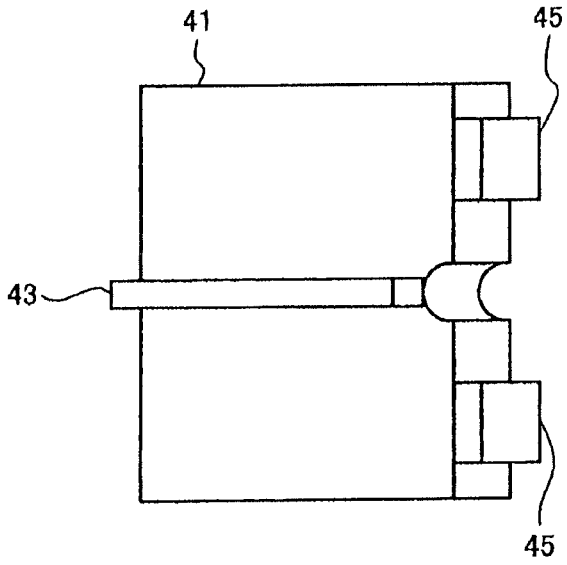
FIGS. 8A and 8B are views for explaining another example of the flexible substrate.
Figure 8B:
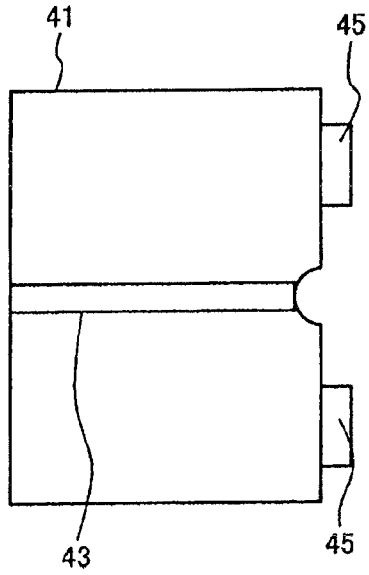

FIGS. 8A and 8B are views for explaining another example of the flexible substrate 41. FIG. 8A is a perspective view illustrating the under surface of the flexible substrate 41 and the side surface of the flexible substrate 41 on the side of the lead pin 36. FIG. 8B is a plan view illustrating the under surface of the flexible substrate 41. As illustrated in FIGS. 8A and 8B, a part of the ground electrode 45 may extend to the side surface of the flexible substrate 41. Thus, the ground electrode 45 can be confirmed. Further, flowing out of the solder 44 that connects the ground electrode 45 to the package 20 can be confirmed.

(Another Example (4) of Flexible Substrate)

Figure 9A:
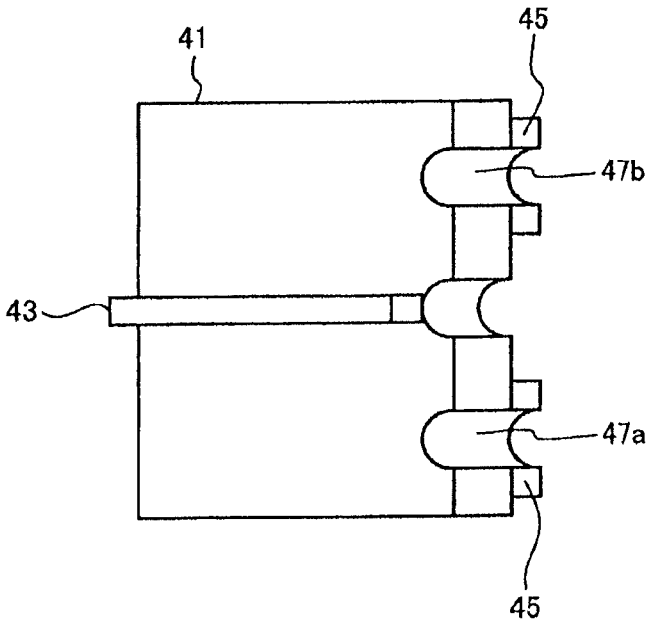
FIGS. 9A and 9B are views for explaining another example of the flexible substrate.
Figure 9B:
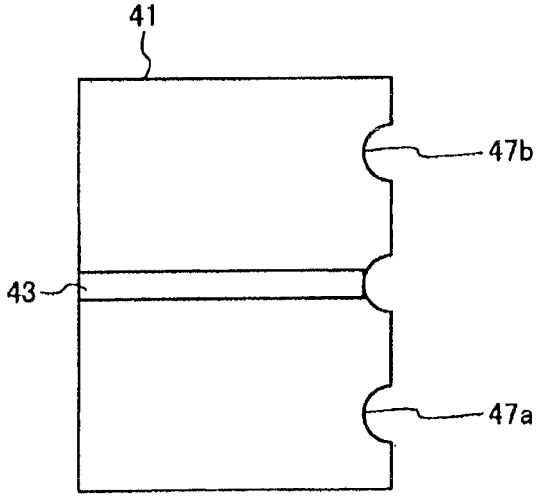

FIGS. 9A and 9B are views for explaining another example of the flexible substrate 41. FIG. 9A is a perspective view illustrating the under surface of the flexible substrate 41 and the side surface of the flexible substrate 41 on the side of the lead pin 36. FIG. 9B is a plan view illustrating the under surface of the flexible substrate 41. As illustrated in FIGS. 9A and 9B, electrodes 47a and 47b may be formed one on each side of a notch at the side surface of the lead pin 36. Moreover, the ground electrode 45 may be connected to the electrodes 47a and 47b. In this case, the ground electrode 45 can be confirmed. Further, flowing out of the solder 44 that connects the ground electrode 45 to the package 20 can be confirmed.

(Another Example of Package)

Figure 10:
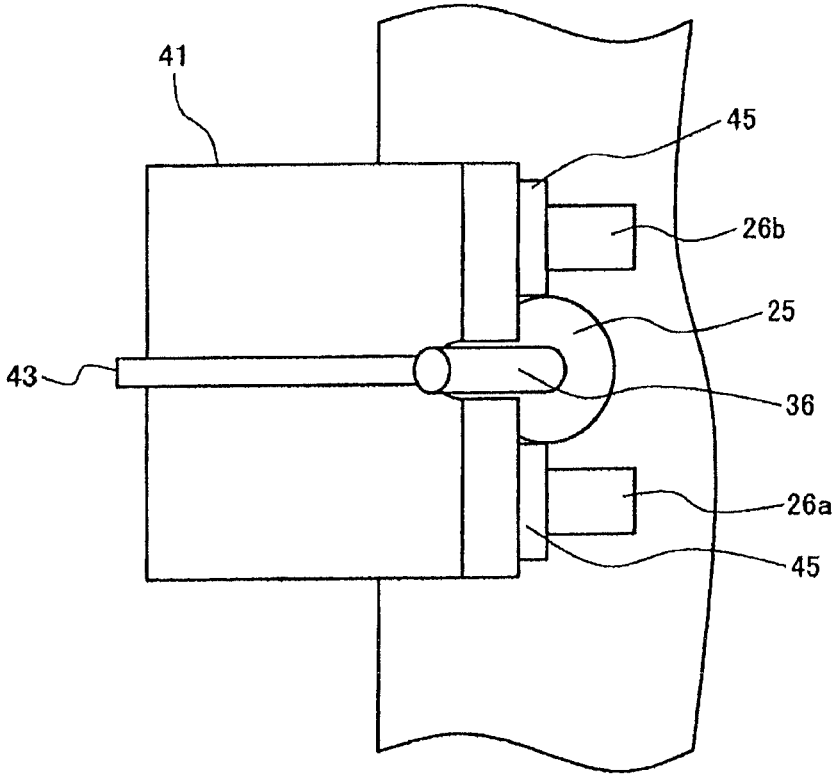
FIG. 10 is a view for explaining another example of a package.

FIG. 10 is a view for explaining another example of the package 20. FIG. 10 is a perspective view illustrating the under surfaces of the flexible substrate 41 and the package 20 and the side surface of the flexible substrate on the side of the lead pin 36. As illustrated in FIG. 10, grooves 26a and 26b may be formed in the package 20 at a part at which the package 20 is connected to the ground electrode 45. That is, at the under surface of the package 20, a concave part may be formed at the part at which the package 20 is connected to the ground electrode 45.

In this case, when the package 20 is connected to the ground electrode 45 by the solder 44, the solder 44 flows in the grooves 26a and 26b. Thus, flowing out of the solder 44 can be confirmed. It is preferable that the grooves 26a and 26b be provided to cross the end part of the flexible substrate 41 on the side of the lead pin 36. This is because it facilitates the confirmation of the flowing out of the solder 44.

Second Embodiment

Figure 11A:
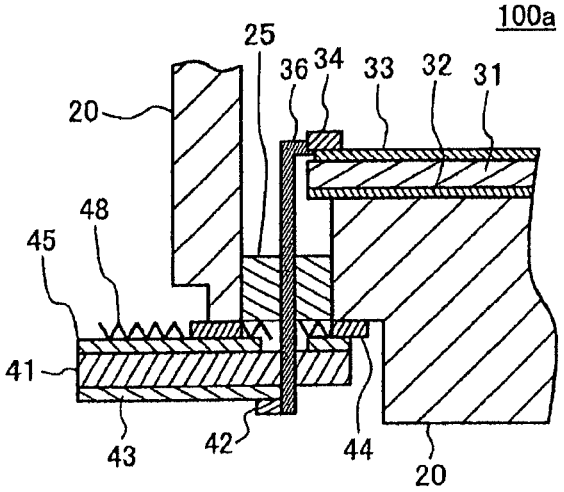
FIGS. 11A through 11C are view for explaining an optical modulator module according to a second embodiment.
Figure 11B:
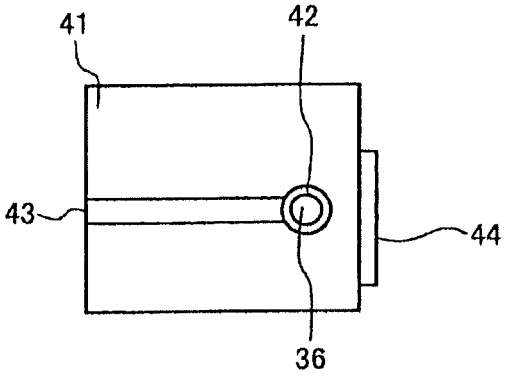
Figure 11C:
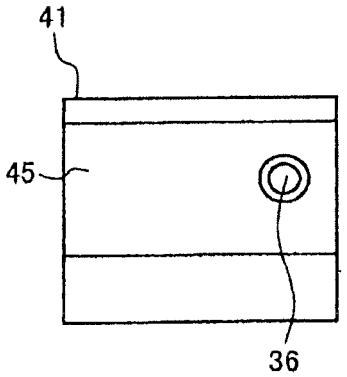

FIGS. 11A through 11C are views for explaining an optical modulator module 100a according to a second embodiment. FIG. 11A is a view corresponding to the view illustrated in FIG. 4A. FIG. 11B is a view corresponding to the view illustrated in FIG. 4B and seen from the under surface side of a flexible substrate 41. FIG. 11C is a view corresponding to the view illustrated in FIG. 4C and seen from the top surface of the flexible substrate 41.

As illustrated in FIGS. 11A through 11C, a lead pin 36 penetrates a glass member 25 and extends to the lower surface of the flexible substrate 41 while penetrating the flexible substrate 41. In this embodiment, the glass member 25 is formed into a cylindrical shape, and the lead pin 36 penetrates the substantial center of the cylindrical shape. The lead pin 36 is connected to a signal electrode 43 at the under surface of the flexible substrate 41 by solder 42. As illustrated in FIG. 11C, a ground electrode 45 is formed to have a predetermined distance between the ground electrode 45 and a part of the flexible substrate 41 at which the lead pin 36 penetrates. Thus, a short circuit of the ground electrode 45 and the lead pin 36 can be prevented.

In this embodiment, since the lead pin 36 penetrates the flexible substrate 41, the flexible substrate 41 can be connected to a package 20 to surround the glass member 25. In this case, a contact area between the flexible substrate 41 and the package 20 is increased. Thus, adhesion between the flexible substrate 41 and the package 20 can be improved.

Note that a gap is preferably formed between the flexible substrate 41 and the package 20 on the extension of the flexible substrate 41. In this case, the connection part of the ground electrode 45 is exposed at the gap. Thus, the connection part of the ground electrode 45 can be confirmed from the under surface side of the flexible substrate 41. Further, at a connection part between the flexible substrate 41 and the package 20, a notch is preferably formed in the package 20 to expose the ground electrode 45. In this case, the connection part of the ground electrode 45 can be confirmed.

Further, on the top surface of the ground electrode 45, an insulative coverlay 48 is preferably provided between the solder 44 and the lead pin 36. In this case, a short circuit of the lead pin 36 and the ground electrode 45 due to flowing out of the solder 44 is suppressed. As the coverlay 48, polyimide or the like can be used.

Figure 12A:
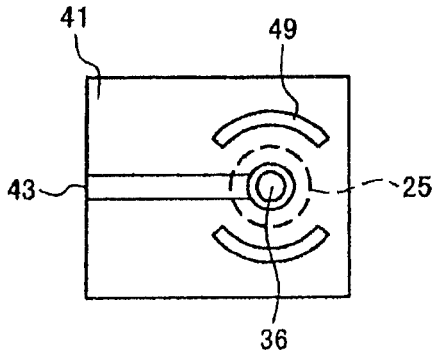
FIGS. 12A through 12D are views for explaining another example of a flexible substrate.

FIGS. 12A through 12D are views for explaining an example of the flexible substrate 41 according to this embodiment. FIGS. 12A through 12D are views seen from the under surface side of the flexible substrate 41. As illustrated in FIG. 12A, through-holes 49 may be formed in the flexible substrate 41 at apart at which the ground electrode 45 is formed. The through-holes 49 are formed to avoid the glass member 25.

Figure 12B:
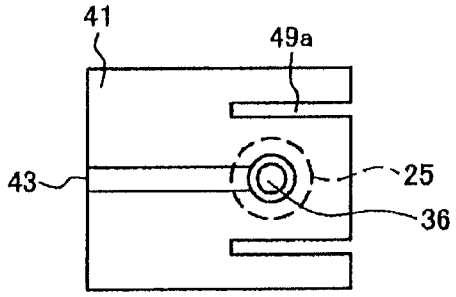
Figure 12C:
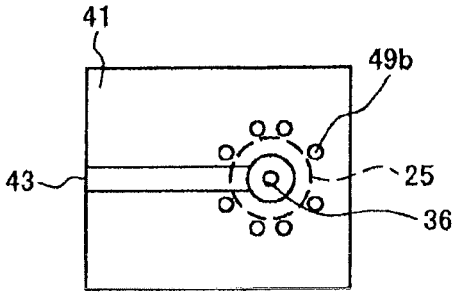

As illustrated in FIG. 12B, notches 49a may be formed in the flexible substrate 41 at the part at which the ground electrode 45 is formed. The notches 49a are formed to avoid the glass member 25. As illustrated in FIG. 12C, plural through-holes 49b may be formed in the flexible substrate 41 to surround the glass member 25. The through-holes 49b may be the same in shape as the through-hole of the lead pin 36. In this case, a through-hole forming process is simplified.

Note that in consideration of high frequency characteristics, solder is preferably attached on the side of the lead pin 36 at the outer edge of the through-holes 49 and 49b and the notches 49a. Further, in order to reduce stress, the solder is preferably not attached on the side far from the lead pin 36 at the outer edge of the through-holes 49 and 49b and the notches 49a. Moreover, the through-holes 49 and 49b and the notches 49a are preferably covered with a transparent dielectric layer. In this case, climbing of the solder can be suppressed.

Figure 12D:
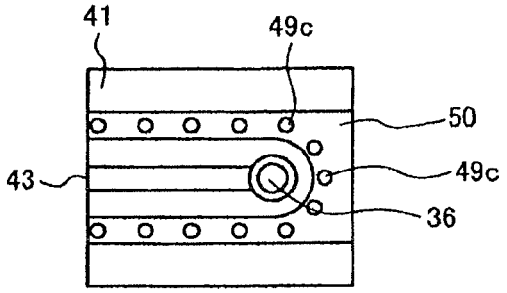

As illustrated in FIG. 12D, vias 49c may be formed in the under surface of the flexible substrate 41 on the side opposite to the signal electrode 43 about the lead pin 36. In this case, straight traveling of a signal capable of being not linked to the lead pin can be suppressed. Further, a ground electrode 50 may be provided on the under surface of the flexible substrate 41 to be connected to the ground electrode 45 by way of the vias 49c. In this case, since a grounded coplanar structure is formed by the signal electrode 43, the ground electrode 45, and the ground electrode 50, grounding on the periphery of the lead pin 36 is enhanced. Note that the vias 49c may be an embedded, but through-type vias can realize the enhancement of grounding and the confirmation of the solder. Note that the configuration illustrated in FIGS. 12A through 12D is also applicable to the first embodiment in which the lead pin 36 is provided along the side surface of the flexible substrate 41.

Figure 13A:
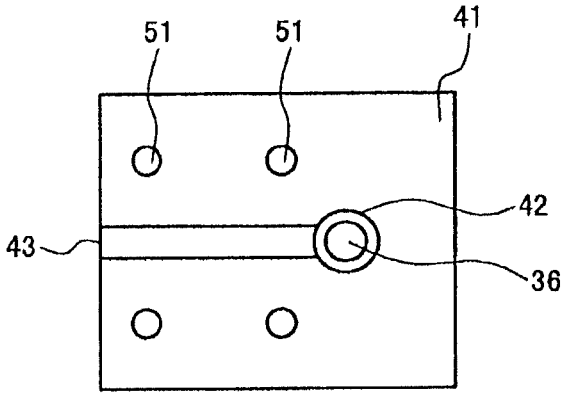
FIGS. 13A through 13C are views for explaining another example of the flexible substrate.

In the above respective embodiments, through-holes for fixation to the package 20 may be formed in the flexible substrate 41. FIG. 13A is a plan view for explaining an example in which through-holes for fixation are formed in the flexible substrate 41. FIG. 13A is a view illustrating the under surface of the flexible substrate 41. As illustrated in FIG. 13A, the plural through-holes 51 for fixation may be formed in the flexible substrate 41.

Figure 13B:
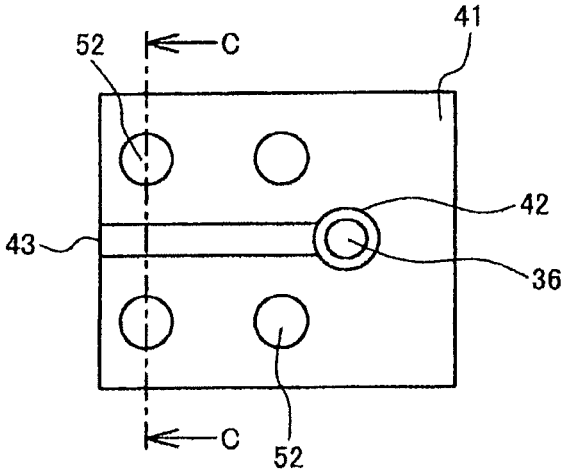
Figure 13C:
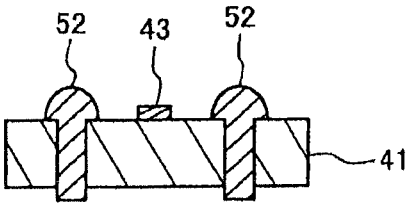

FIG. 13B is a plan view for explaining an example in which fixation pins 52 are inserted into the through-holes 51. FIG. 13C is a cross-sectional view taken along line C-C in FIG. 13B. As illustrated in FIGS. 13B and 13C, insertion of the fixation pins 52 into the through-holes 51 can improve fixation strength between the flexible substrate 41 and the package 20. Further, with the provision of the fixation pins 52 so as to protrude more than the lead pin 36 on the under surface side of the flexible substrate 41, not only the productivity of the optical modulator module but also fixation strength of the flexible substrate 41 can be improved.

Note that in a case where the flexible substrate 41 has a MSL structure, the value of an impedance in a MSL mode that transmits the flexible substrate 41 becomes important. Unlike a CPW mode, the thickness of the flexible substrate 41 and the line width of the signal electrode 43 become important parameters. If the flexible substrate 41 is thin when the flexible substrate 41 is set to have an electric resistance of 50Ω, it is necessary to reduce the line width of the signal electrode 43. In this case, a conductor loss may be increased, and an impedance may be greatly changed due to a slight change in signal line width. Therefore, the thickness of the flexible substrate 41 is preferably in the range of about several tens through 100 μm.

Figure 14A:
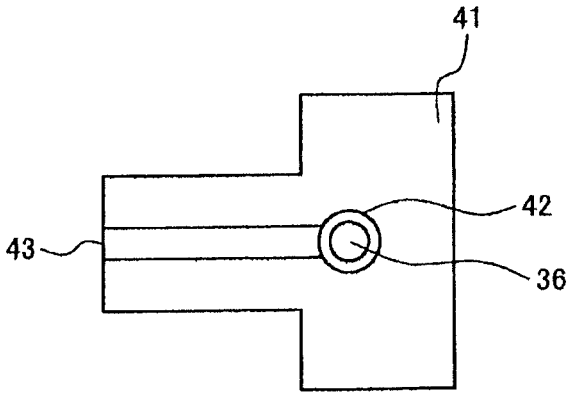
FIGS. 14A and 14B are views for explaining another example of the flexible substrate.
Figure 14B:
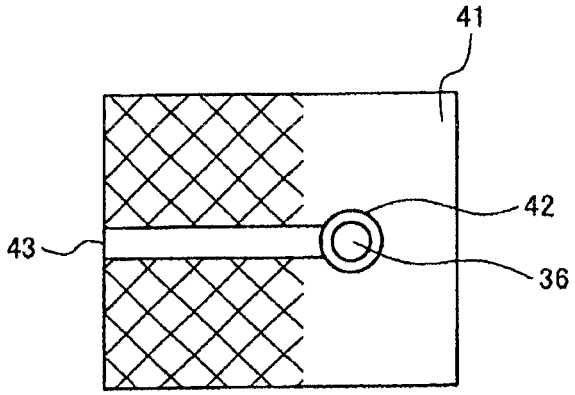

However, if the flexible substrate 41 impairs flexibility due to its increased thickness, it may have a part having more flexibility than the connection part at which the flexible substrate 41 is connected to the package 20. For example, as illustrated in FIG. 14A, the width of the ground electrode 45 on the flexible substrate 41 may be narrowed at a part other than the connection part. Further, as illustrated in FIG. 14B, the ground electrode 45 may be formed into a meshed shape at a part other than the connection part. In these cases, flexibility of the flexible substrate 41 can be improved.

Figure 15A:
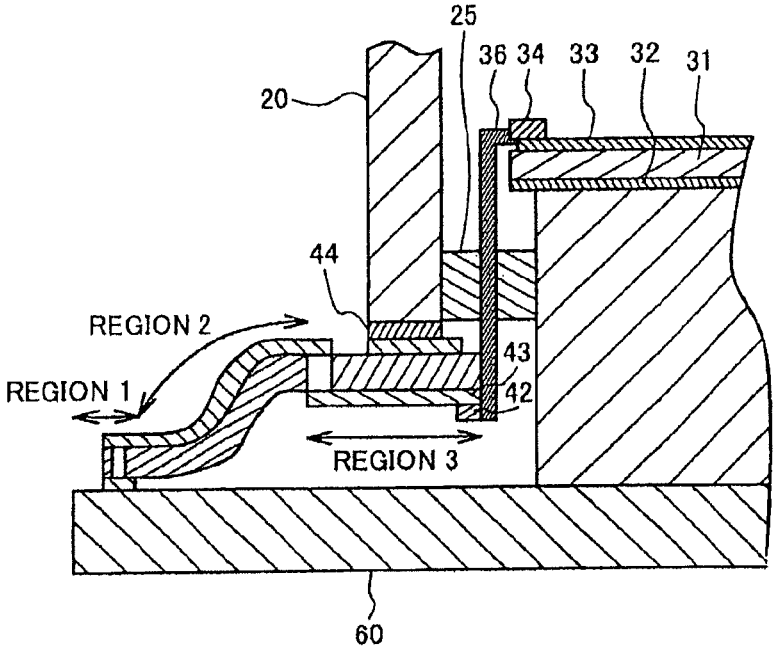
FIGS. 15A and 15B are views for explaining connection between the flexible substrate and a print substrate.

Alternatively, the ground electrode 45 may be provided only on the same surface as the signal electrode 43 at a part other than the connection part. For example, as illustrated in FIG. 15A, it is assumed that a connection part between the flexible substrate 41 and the package 20 is a region [1] *3* and a connection part between the flexible substrate 41 and a print substrate 60 is a region [3] *1*. The flexible substrate 41 is connected to the print substrate 60 at an end part on the side opposite to the lead pin 36. It is assumed that a region between the regions 1 and 3 is a region 2. Although the regions 1 and 3 have a MSL or GCPW, provision of a single-sided electrode in the region 2 can improve flexibility of the flexible substrate 41.

Figure 15B:
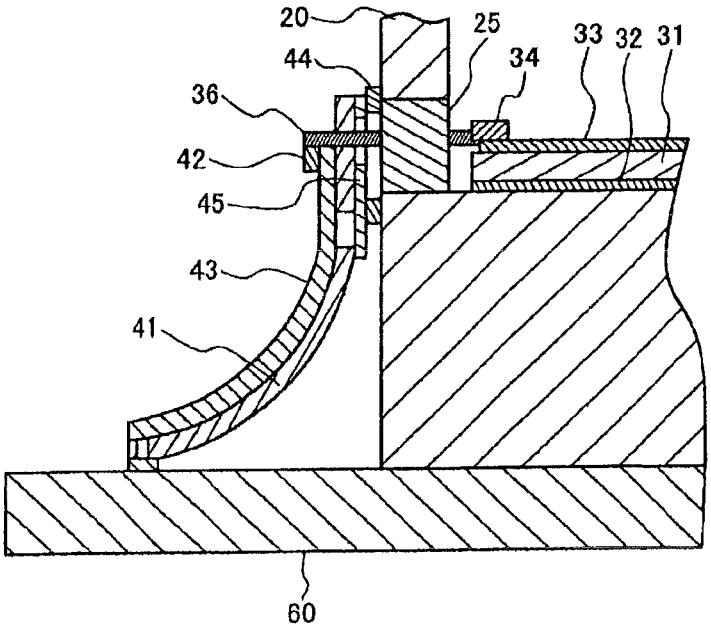

Note that if the flexible substrate 41 has sufficient flexibility, the lead pin 36 may be provided to be perpendicular to the side surface of the package 20 and the flexible substrate 41 may be folded by 90 degrees as illustrated in FIG. 15B.

Figure 16A:
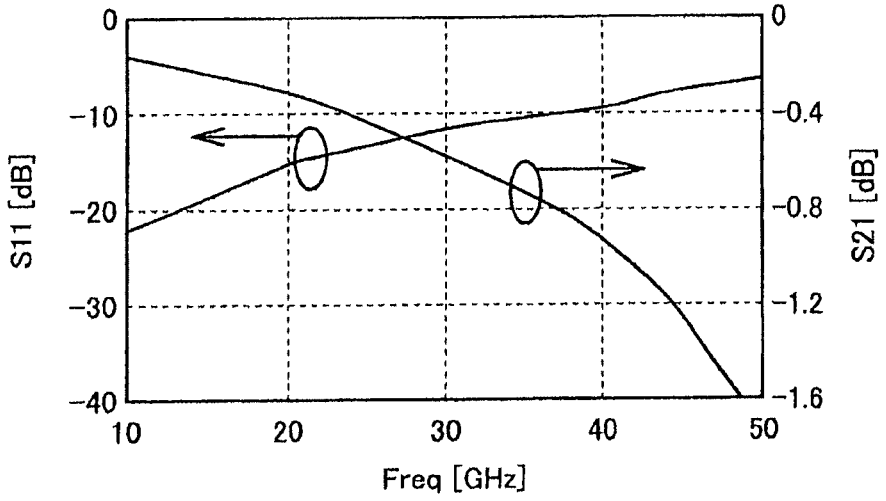
FIGS. 16A and 16B are graphs for explaining calculation results of S parameters.
Figure 16B:
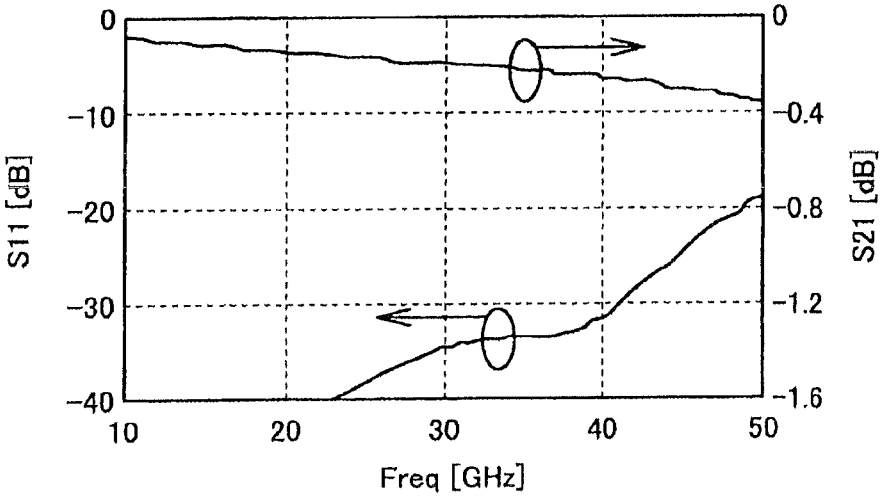

FIG. 16A is a graph illustrating calculation results of S parameters of the optical modulator module according to the second comparative example. FIG. 16B is a graph illustrating calculation results of the S parameters of the optical modulator module 100a according to the second embodiment illustrated in FIG. 12D. As illustrated in FIGS. 16A and 16B, the reflecting characteristics (S11) and the transmitting characteristics (S21) of the optical modulator module 100a according to the second embodiment are improved compared with the optical modulator module according to the second comparative example.

Third Embodiment

Figure 17A:
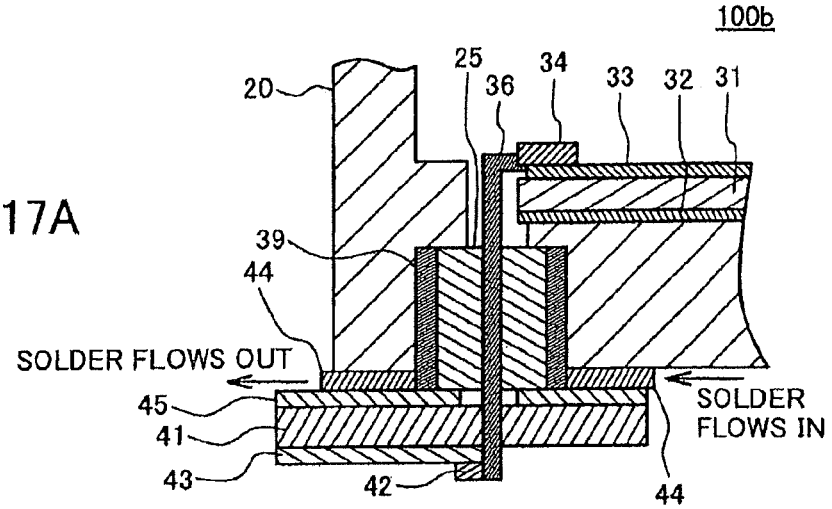
FIGS. 17A through 17C are views for explaining an optical modulator module according to a third embodiment.
Figure 17B:
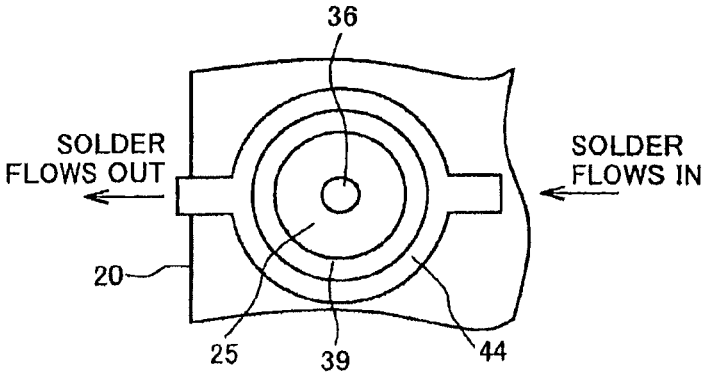
Figure 17C:
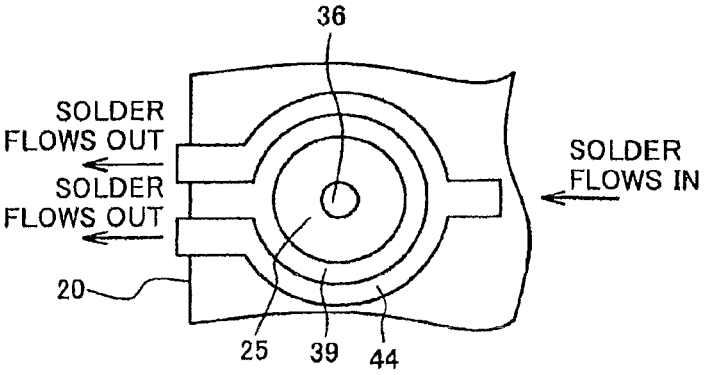

FIG. 17A is a view for explaining an optical modulator module 100b according to a third embodiment. FIG. 17A is the view corresponding to the view illustrated in FIG. 4A. FIGS. 17B and 17C are views seen from the under surface side of a package 20.

In this embodiment, an external conductor 39 is provided on the periphery of a glass member 25 as illustrated in FIG. 17A. Thus, a coaxial line (having a resistance of, for example, 50Ω) is formed by a lead pin 36, the glass member 25, and the external conductor 39. In this embodiment, the coaxial line is inserted into a concave part at the under surface of the package 20.

In this case, solder 44 is preferably connected to a flexible substrate 41 to encircle the periphery of the external conductor 39. Therefore, a groove is preferably provided along the periphery of the external conductor 39 in the package 20 as illustrated in FIG. 17B. In this case, the solder 44 encircles the periphery of the external conductor 39 via the groove. With the provision of an inlet for flowing the solder 44 in the groove and an outlet for confirming flowing out of the solder 44, soldering can be effectively performed.

Note that the groove encircling the periphery of the external conductor 39 may have two paths as illustrated in FIG. 17C. In this case, since two outlets for confirming the flowing out of the solder 44 are provided, the solder flowing out from both of the paths can be confirmed. Thus, confirmation as to whether the solder 44 flows in both of the paths can be made. As a result, sufficient grounding can be obtained, and degradation of the S parameters can be suppressed.

Figure 18:
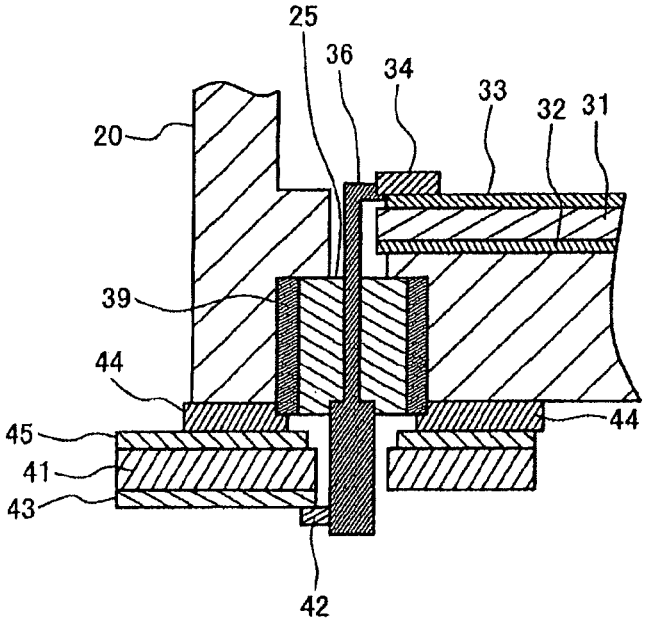
FIG. 18 is a view for explaining the optical modulator module according to the third embodiment.

Note that if adhesion between the glass member 25 and the flexible substrate 41 is reduced, a gap is formed between the glass member 25 and the flexible substrate 41. In this case, a characteristic impedance may become large at the gap. Therefore, as illustrated in FIG. 18, the thickness (Wair) of the lead pin 36 at a part at which the lead pin 36 is connected to a signal electrode 43 may be greater than the thickness (Wglass) of the lead pin 36 at a part at which the lead pin 36 penetrates the glass member 25. In this case, the impedance is corrected. Note that the cross section of the lead pin 36 at the part at which the lead pin 36 is connected to the signal electrode 43 may be a circular shape or a rectangular shape but it is not particularly limited.

Fourth Embodiment

Figure 19:
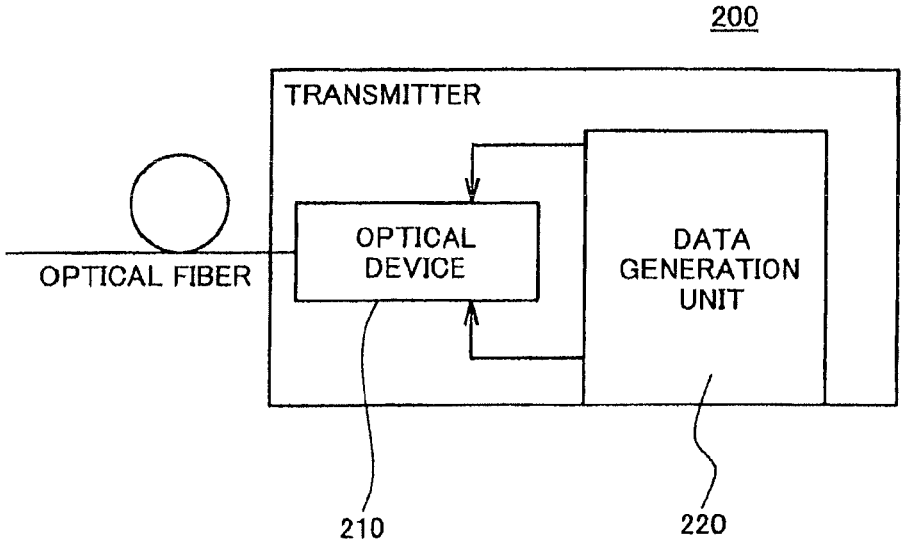
FIG. 19 is a block diagram for explaining the entire configuration of an optical transmitter according to a fourth embodiment.

FIG. 19 is a block diagram for explaining the entire configuration of an optical transmitter according to a fourth embodiment. As illustrated in FIG. 19, the optical transmitter 200 has an optical device 210, a data generation unit 220, and the like. The optical device 210 is a semiconductor laser or the like having any one of the optical modulator modules described above. The data generation unit 220 transmits a driving signal for driving the optical device 210 to the optical device 210. The optical device 210 outputs an optical modulation signal in response to the driving signal from the data generation unit 220. The optical modulation signal is output to an outside via an optical fiber or the like.

Each of the embodiments described above uses the Mach-Zehnder type optical modulator module as an optical modulator, but the optical modulator is not limited to it. Any optical modulator having a ground electrode and a signal electrode is applicable to the embodiments described above.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. An optical modulator module comprising:

an optical modulator configured to have a first signal electrode and a first ground electrode;

a conductive package configured to accommodate the optical modulator and have electrical continuity with the first ground electrode of the optical modulator;

an insulative member configured to penetrate the conductive package;

a substrate configured to have a second ground electrode on a first surface thereof electrically connected to the package by solder or a conductive adhesive and have a second signal electrode on a second surface thereof; and a lead pin configured to penetrate the insulative member and electrically connect the first signal electrode of the optical modulator to the second signal electrode of the substrate, wherein a gap is formed between the substrate and the package on an extension of the substrate.

2. The optical modulator module according to claim 1, wherein the second ground electrode and the second signal electrode of the substrate have a micro strip line structure.

3. The optical modulator module according to claim 1, wherein the lead pin extends to the second surface while being in contact with a side surface of the substrate.

4. The optical modulator module according to claim 3, wherein the lead pin has a rectangular cross section.

5. The optical modulator module according to claim 3, wherein a notch at which the lead pin is arranged is formed in the side surface of the substrate.

6. The optical modulator module according to claim 1, wherein a notch for exposing the second ground electrode of the substrate is formed in a side surface of the substrate.

7. The optical modulator module according to claim 1, wherein a notch is formed in a side surface of the substrate, and the second ground electrode of the substrate extends to the notch.

8. The optical modulator module according to claim 1, wherein a groove crossing an end part of the substrate is formed in a surface of the package connected to the substrate.

9. The optical modulator module according to claim 1, wherein the gap is formed by a notch for exposing the second ground electrode, and the notch is formed in the package at a connection part between the package and the second ground electrode of the substrate.

10. The optical modulator module according to claim 1, wherein a through-hole is formed in the substrate at a connection part between the package and the second ground electrode of the substrate.

11. The optical modulator module according to claim 10, wherein a third ground electrode is formed on the second surface of the substrate, and the third ground electrode on the second surface is electrically connected to the second ground electrode on the first surface via the through-hole.

12. The optical modulator module according to claim 1, wherein a notch extending from the first surface of the substrate to the second surface thereof is formed in a connection part between the package and the second ground electrode of the substrate.

13. The optical modulator module according to claim 1, wherein an insulative coverlay is provided between the second ground electrode and the lead pin on the first surface of the substrate.

14. The optical modulator module according to claim 1, wherein a shortest distance between the lead pin and the second ground electrode of the substrate is less than or equal to 260 μm.

15. The optical modulator module according to claim 1, wherein a length of the lead pin protruding from the second surface of the substrate is less than or equal to 590 μm.

16. The optical modulator module according to claim 1, wherein a fixation pin for fixing the substrate to the package via a through-hole is provided in the substrate.

17. The optical modulator module according to claim 1, wherein the substrate is a flexible substrate.

18. The optical modulator module according to claim 17, wherein the substrate has a part having more flexibility than a connection part between the substrate and the package.

19. The optical modulator module according to claim 1, wherein a thickness of the lead pin at a part protruding from a glass member to an outside of the package is greater than a thickness of the lead pin in the glass member.

*20. The optical modulator module as claimed in claim 1, wherein an end portion of the substrate is positioned lower than an area where the package is fixed on the substrate, the end portion being opposite to the area.*

*21. The optical modulator module as claimed in claim 1, wherein the substrate includes a through hole penetrating from the first surface to the second surface, and the lead pin penetrates the through hole.*

* * * * *